United States Patent [19]

Ohara

[11] Patent Number: 4,697,269
[45] Date of Patent: * Sep. 29, 1987

[54] LASER APPARATUS

[75] Inventor: Yuji Ohara, Kaisei, Japan

[73] Assignee: Fuji Photo Film Co., Ltd., Japan

[*] Notice: The portion of the term of this patent subsequent to Feb. 25, 2003 has been disclaimed.

[21] Appl. No.: 528,250

[22] Filed: Aug. 31, 1983

[30] Foreign Application Priority Data

Sep. 3, 1982 [JP] Japan .................. 57-153539

[51] Int. Cl.$^4$ .................................. H01S 3/04
[52] U.S. Cl. ................................ 372/34; 372/61; 372/92; 372/33
[58] Field of Search ............... 372/34, 55, 61, 58, 372/59, 92, 107, 65, 38, 33

[56] References Cited

U.S. PATENT DOCUMENTS

| 3,553,604 | 1/1971 | Andress et al. | 372/107 |
|---|---|---|---|
| 3,781,709 | 12/1973 | Himtrimger | 372/107 |
| 3,783,407 | 1/1974 | Mefferd et al. | 372/107 |
| 3,805,015 | 4/1974 | Herzoger et al. | 372/107 |
| 3,921,098 | 11/1975 | Hoag | 372/58 |
| 4,316,157 | 2/1982 | Dosi et al. | 372/58 |
| 4,328,464 | 5/1982 | Pivirotto | 372/58 |
| 4,387,462 | 6/1983 | Markus | 372/34 |
| 4,573,159 | 2/1986 | Aagano et al. | 372/58 |

FOREIGN PATENT DOCUMENTS 3028421 2/1982 Fed. Rep. of Germany ...... 372/107

OTHER PUBLICATIONS

Turgeon, "High Repetition Rate EOA $CO_2$ Laser"; IEEE JQE, vol. QE-7, No. 10, Oct. 1971.
Fradin et al., "A Recirculating Self-Contained DF/HF Pulsed Laser", IEEE Jour. Quant. Elect., vol. QE-11, No. 8, Part 1, pp. 631-633, Aug. 1975.
Glowiczewski et al., "$N_2$ Laser Tube Transversal Gas Recirculation", Optical Application, vol. X, No. 2, 1980.
Arzaov et al.; "Compact Pulse-Periodic $CO_2$ Laser", Sov. Jour. Quant. Electron, No. 3, Mar. 1979, p. 356.

Primary Examiner—Leon Scott, Jr.
Attorney, Agent, or Firm—Gerald J. Ferguson, Jr.; Michael P. Hoffman; Ronni S. Malamud

[57] ABSTRACT

A laser apparatus comprises a case, a laser tube positioned within the case, and a temperature control means for controlling the temperature of the atmosphere within the case. The temperature is controlled within the range of 35° to 70° C. The temperature control means is an air cooling means for generating air streams flowing from an air inlet formed in one side wall of the case to air outlets formed in the opposite side wall.

6 Claims, 1 Drawing Figure

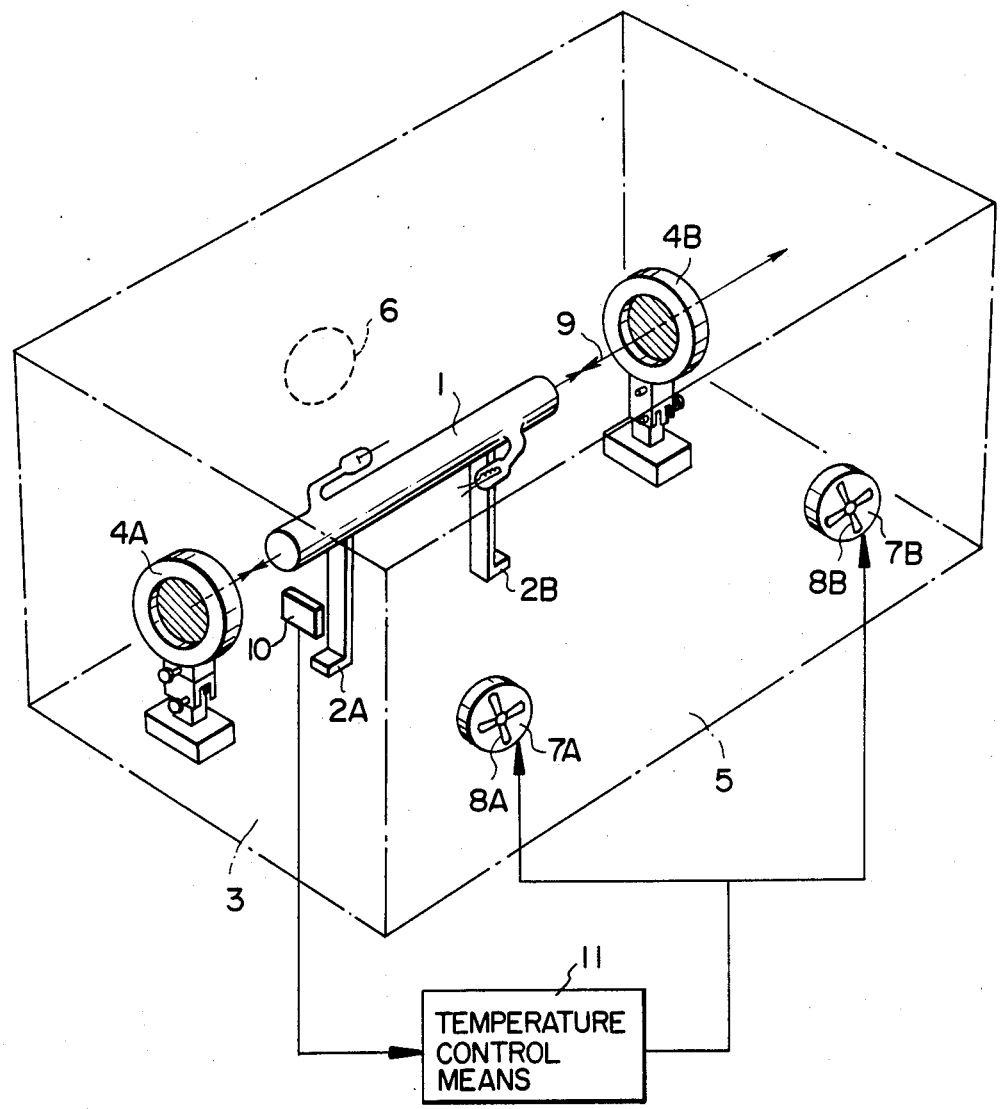

LASER APPARATUS

BACKGROUND OF THE INVENTION

1. Field of the Invention

This invention relates to a laser apparatus provided with a laser tube, and more particularly to an external mirror type laser apparatus.

2. Description of the Prior Art

As is well known, laser apparatuses provided with a laser tube are widely used for measuring instruments, analyzers, communication apparatuses, image recording apparatuses, image read-out apparatuses, holography, welding apparatuses, medical apparatuses such as laser scalpels, nuclear fusion, and the like.

There are various types of laser apparatuses, one of which is a gas laser apparatus. As the gas laser apparatus, there is known an external mirror type laser apparatus comprising a columnar laser tube and a pair of external mirrors positioned independently of the laser tube along the axis of the laser tube for emitting a laser beam.

In the external mirror type laser apparatus, the external mirrors and mounts for supporting the laser tube for emitting a laser beam are installed on the same supporting plate. In the laser apparatus constructed as described above, when a voltage is applied to the laser tube to emit a laser beam, a very large amount of heat is generated from the vicinity of the middle portion of the laser tube. The heat generated by the laser tube is transferred to the supporting plate via the mounts of the laser tube, or transferred to portions of the supporting plate around the laser tube by heat convection or heat radiation. However, because the amount of heat generated is largest at the middle portion of the laser tube, a difference in temperature occurs between the central portion of the supporting plate where the middle portion of the laser tube is positioned and the peripheral portions of the supporting plate where the external mirrors are positioned. When a temperature gradient occurs through the supporting plate as described above, the external mirrors are shifted out of their positions along the axis of the laser tube due to a difference in the thermal expansion of the supporting plate. As a result, the intensity of the laser beam emitted from the laser apparatus becomes low or, in the worst case, laser emission is not effected. In order to eliminate these problems, it has heretofore been conventional to adjust the positions of the external mirrors periodically, for example, monthly. However, it is very troublesome to correct the positions of the external mirrors and, even when the correction of the positions of the external mirrors is effected, the occurrence of the shift of the external mirrors cannot always be prevented during the use of the laser apparatus.

SUMMARY OF THE INVENTION

The primary object of the present invention is to provide an external mirror type laser apparatus which prevents the external mirrors from shifting due to nonuniform temperature rise in the supporting plate during the use of the laser apparatus.

Another object of the present invention is to provide an external mirror type laser apparatus which maintains the temperature around the laser tube uniform, thereby making the temperature of the supporting plate uniform.

The laser apparatus of the present invention comprises a case, a laser tube positioned within the case, and a temperature control means for controlling the temperature of the atmosphere within the case.

In the present invention, it becomes possible to maintain uniform the temperature within the case, i.e. the temperature of the atmosphere around the laser tube. Therefore, it is possible to make the temperature of the supporting plate uniform and prevent the external mirrors from shifting due to nonuniform increase in the temperature of the supporting plate.

In the present invention, the temperature control means is an air cooling means. The air cooling means may comprise, for example, an air inlet positioned in one side wall of the case for introducing external air into the case, and air outlets positioned in the other side wall of the case for discharging air from the case, whereby air streams are generated between the air inlet and the air outlets. When the air inlet is positioned near the middle portion of the laser tube where much heat is generated and the air outlets are positioned near the end portions of the laser tube where the amount of heat generated is not so large, the vicinity of the middle portion of the laser tube is cooled by the external air introduced through the air inlet, and the end portions of the laser tube are warmed by the air streams the temperature of which has been raised when the air streams pass over the vicinity of the middle portion of the laser tube. Therefore, the temperature of the atmosphere within the case can be maintained uniform, and the temperature distribution within the case, particularly the temperature distribution of the supporting plate, can be made uniform. Accordingly, it is possible to prevent the external mirrors from shifting.

In general, the temperature of the atmosphere within the case should preferably be within the range of 35° to 70° C.

BRIEF DESCRIPTION OF THE DRAWING

The single drawing is a schematic perspective view showing an embodiment of the laser apparatus in accordance with the present invention.

DESCRIPTION OF THE PREFERRED EMBODIMENTS

The present invention will hereinbelow be described in further detail with reference to the accompanying drawing.

In the drawing, a laser tube 1 is placed on a supporting plate 3 via mounts 2A and 2B. Along the axis of the laser tube 1 are positioned a pair of external mirrors 4A and 4B for reflecting a laser beam. The laser tube 1, the external mirrors 4A and 4B and the supporting plate 3 are contained in a case 5. In one side wall of the case 5 is formed an air inlet 6 for introducing air into the case 5 in such a position that air introduced through the air inlet 6 impinges against the middle portion of the laser tube 1. In the side wall of the case 5 opposite to the aforesaid side wall provided with the air inlet 6, air outlets 7A and 7B are positioned so that air introduced through the air inlet 6 is passed over the end portions of the laser tube 1 and then discharged through the air outlets 7A and 7B. The air outlets 7A and 7B are provided with fans 8A and 8B for generating air streams.

In the laser apparatus constructed as described above, when a voltage is applied to the laser tube 1 to generate a laser beam 9, the temperature of the laser tube 1 rises in such a manner that the temperature is highest at the middle portion of the laser tube 1, and the temperatures of the end portions of the laser tube 1 are lower than the temperature of the middle portion of the laser tube 1. When the operation of the laser tube 1 is continued in this condition, there is a risk of the temperature of the atmosphere within the case 5 becoming nonuniform. In this case, the temperature distribution of the supporting plate 3 becomes nonuniform and, as a result, the external mirrors 4A and 4B are shifted from the positions along the axis of the laser tube 1. However, when the temperature rise within the case 5 is detected by a temperature detector 10 positioned in a predetermined position within the case 5, the fans 8A and 8B positioned in the air outlets 7A and 7B are rotated, and the middle portion of the laser tube 1 where the temperature is highest is cooled most efficiently. The air streams warmed when they cool the middle portion of the laser tube 1 go to and warm the end portions of the laser tube 1 where the temperatures are relatively low. In this manner, the temperature of the atmosphere within the case 5 is made approximately uniform, and the temperature distribution of the supporting plate 3 is also made uniform. Accordingly, shifting of the external mirrors 4A and 4B due to a difference in thermal expansion of the supporting plate 3 is prevented. The temperature of the atmosphere within the case 5 may be maintained at a predetermined value by interlocking the fans 8A and 8B with the temperature detector 10 so that they are rotated and stopped according to the detected temperature, or by controlling the rotation speed of the fans 8A and 8B according to the output level of the temperature detector.

In the embodiment described above, the difference in temperatures within the case 5 can be restricted to a very small range within 6° or 7° C. In order to shorten the rise time at the beginning of laser emission of the laser apparatus, the laser tube should preferably be heated in advance to a predetermined temperature. For this purpose, it is advantageous to position heaters within the case 5 or at the mounts 2A and 2B of the laser tube 1. In this case, because the temperature rise is slower at the end portions of the laser tube 1, it is further advantageous to position heaters having a larger capacity near the end portions of the laser tube 1.

Even in the laser apparatus provided with the temperature control means 11 in accordance with the present invention, when a voltage is applied to the laser tube 1 for emission of a laser beam, a slight shift occurs between the positions of the external mirrors 4A and 4B where the laser power is highest at the temperature of the atmosphere around the laser tube 1 immediately after the application of the voltage and the positions of the external mirrors 4A and 4B wherein the laser power is highest in the steady temperature control condition. This is because there is a difference in temperature between the stages immediately after the application of the voltage and in the steady temperature control condition. However, by positioning the external mirrors 4A and 4B at the middle between the aforesaid positions in the two stages, it is possible to improve the laser power output characteristics at the beginning of the operation of the laser apparatus and to obtain a high, stable output also in the steady condition.

I claim:

1. A laser apparatus for generating a laser beam comprising a hollow case having sidewalls, a laser beam generating means including a laser tube having an axis, a pair of external mirrors positioned along said laser tube axis and a support plate, said laser tube and said pair of external mirrors being connected to and supported by said support plate, said laser beam generating means being positioned within said case, and said apparatus further including temperature detecting means and temperature control means for controlling the temperature of the atmosphere within said case, a cooling fan disposed at a position corresponding to each external mirror at an end portion of said laser tube, and an air inlet formed in said case at a position substantially corresponding to a middle portion of said laser tube.

2. A laser apparatus as defined in claim 1 wherein the temperature of said atmosphere is controlled by said temperature control means within the range of 35° to 70° C.

3. A laser apparatus as defined in claim 1 wherein said temperature control means is an air cooling means for air cooling the inside of said case.

4. A laser apparatus as defined in claim 3 wherein said air cooling means is an air stream generating means for generating air streams flowing from said air inlet which is formed in one side wall of said case to air outlets formed in the other side wall of said case.

5. A laser apparatus as defined in claim 4 wherein said air outlets are positioned near the end portions of said laser tube.

6. A laser apparatus as defined in claim 4 or 5 wherein said cooling fans are provided in said air outlets.

* * * * *